United States Patent
Beuzit et al.

(10) Patent No.: US 11,416,316 B2
(45) Date of Patent: Aug. 16, 2022

(54) SYSTEM, METHOD AND APPARATUS FOR CORRELATION OF DATA OBJECTS

(71) Applicant: AMADEUS S.A.S., Biot (FR)

(72) Inventors: Serge Beuzit, Mouans Sartoux (FR); Jean-Samuel Pasquali, Grasse (FR)

(73) Assignee: AMADEUS S.A.S., Biot (FR)

( * ) Notice: Subject to any disclaimer, the term of this patent is extended or adjusted under 35 U.S.C. 154(b) by 55 days.

(21) Appl. No.: 17/071,575

(22) Filed: Oct. 15, 2020

(65) Prior Publication Data

US 2021/0124629 A1    Apr. 29, 2021

(30) Foreign Application Priority Data

Oct. 24, 2019    (FR) ..................... 1911906

(51) Int. Cl.
*G06F 9/54* (2006.01)
*G06F 16/23* (2019.01)
*G06F 16/28* (2019.01)

(52) U.S. Cl.
CPC .............. *G06F 9/542* (2013.01); *G06F 9/546* (2013.01); *G06F 16/2379* (2019.01); *G06F 16/288* (2019.01)

(58) Field of Classification Search
None
See application file for complete search history.

(56) References Cited

U.S. PATENT DOCUMENTS 9,514,498 B2 * 12/2016 Masini ................... G06Q 50/14
9,973,374 B1   5/2018 Ratias
2014/0200932 A1 * 7/2014 Daouk et al. ........... H04L 51/16
2015/0088841 A1 * 3/2015 Fuglsang .............. G06F 16/215
                                                      707/692
2016/0147622 A1   5/2016 Nichols et al.
2018/0150477 A1   5/2018 Jewell et al.
2018/0285777 A1 * 10/2018 Li .......................... G06N 5/045

FOREIGN PATENT DOCUMENTS

| AU | 2015201818 A1 | 10/2015 |
| EP |    2500832 A1 | 9/2012 |
| WO | WO-2015094004 A1 | 6/2015 |
| WO | WO-2016168726 A1 | 10/2016 |

* cited by examiner

*Primary Examiner* — Charles E Anya
(74) *Attorney, Agent, or Firm* — Perry + Currier

(57) ABSTRACT

A first-to-second correlation engine determines correlations between first objects from a first object feed, and second objects from a second object storage, and generates first correlation messages indicative of the correlations for a first-to-second object direction and a second-to-first object direction. A second-to-first correlation engine determines respective correlations between the second objects from a second object feed and the first objects from a first object storage, and generates second correlation messages indicative of the respective correlations for the second-to-first object direction and the first-to-second object direction. A first-to-second correlation storage engine receives the first and second correlation messages for the first-to-second object direction and updates first-to-second correlation storage based on the received messages. A second-to-first correlation storage engine receives the first and second correlation messages for the second-to-first object direction and updates a second-to-first object correlation storage based on the received correlation messages.

18 Claims, 9 Drawing Sheets

SYSTEM, METHOD AND APPARATUS FOR CORRELATION OF DATA OBJECTS

CROSS-REFERENCE TO RELATED APPLICATION

This application claims priority to French patent application no. 1911906, filed Oct. 24, 2019, the content of which is incorporated herein by reference.

FIELD

The specification relates generally to data object handling, and specifically to a system, method and apparatus for detecting correlations between data objects.

BACKGROUND

Certain computing systems intermediate between various entities, such as other computing systems that provide input data representing various types of data objects. Correlations between the above-mentioned data objects may need to be tracked for subsequent action by other entities in the systems. The intermediating computing system may detect the above correlations, but messages indicating updates to data objects that affect the detection of correlations may be received at unpredictable times and in unpredictable orders. This can lead to detection of incorrect correlations, requiring manual intervention to correct or, if not corrected, to incorrect system behaviour.

SUMMARY

An aspect of the specification provides a system for correlation of data objects, the system comprising: (i) a first-to-second correlation engine configured to: determine correlations between first objects, as received via a first object feed, and second objects as stored at a second object storage; and generate first correlation messages indicative of the correlations for both a first-to-second object direction and a second-to-first object direction; (ii) a second-to-first correlation engine configured to: determine respective correlations between the second objects, as received via a second object feed, and the first objects as stored at a first object storage; and generate second correlation messages indicative of the respective correlations for both the second-to-first object direction and the first-to-second object direction; (iii) a first-to-second correlation storage engine configured to: receive the first correlation messages and the second correlation messages for the first-to-second object direction; and one or more of populate and update a first-to-second object correlation storage based on received correlation messages; and (iv) a second-to-first correlation storage engine configured to: receive the first correlation messages and the second correlation messages for the second-to-first object direction; and one or more of populate and update a second-to-first object correlation storage based on respective received correlation messages.

The first-to-second storage engine can be further configured to, in response to storing an updated first-to-second object correlation at the first-to-second object correlation storage: transmit, to the second-to-first storage engine, a command to remove an existing second-to-first object correlation at the second-to-first object correlation storage, the existing second-to-first object correlation corresponding to a first-to-second object correlation that is one or more of removed and updated by the updated first-to-second object correlation.

The second-to-first storage engine can be further configured to, in response to storing an updated second-to-first object correlation at the second-to-first object correlation storage: transmit, to the first-to-second storage engine, a command to remove an existing first-to-second object correlation at the first-to-second object correlation storage, the existing first-to-second object correlation corresponding to a second-to-first object correlation that is one or more of removed and updated by the updated second-to-first object correlation.

The system can further comprise a first object feed engine configured to: receive the first objects from the first object feed; store the first objects at the first object storage; and provide the first objects to the first-to-second correlation engine.

The system can further comprise a second object feed engine configured to: receive the second objects from the second object feed; store the second objects at the second object storage; and provide the second objects to the second-to-first correlation engine.

The first-to-second storage engine can be further configured to one or more of populate and update the first-to-second object correlation storage based on the received correlation messages by one or more of: storing, at the first-to-second object correlation storage, a new first-to-second correlation indicated by the received correlation messages; adding, at the first-to-second object correlation storage, to an existing first-to-second correlation, an additional first-to-second correlation indicated by the received correlation messages; and replacing, at the first-to-second object correlation storage, the existing first-to-second correlation with an updated first-to-second correlation indicated by the received correlation messages.

The second-to-first storage engine can be further configured to one or more of populate and update the second-to-first object correlation storage based on the respective received correlation messages by one or more of: storing, at the second-to-first object correlation storage, a new second-to-first correlation indicated by the respective received correlation messages; adding, at the second-to-first object correlation storage, to an existing second-to-first correlation, an additional second-to-first correlation indicated by the respective received correlation messages; and replacing, at the second-to-first object correlation storage, the existing second-to-first correlation with an updated second-to-first correlation indicated by the respective received correlation messages.

The first objects and the second objects can respectively comprise different ones of passenger name records, ticket data, schedule data, inventory data, customer management data, baggage and history data, crew data, flight management data; revenue accounting data, loyalty data, customer experience data, and customer relationship data.

The first-to-second correlation storage engine is further configured to: in response to populating or updating the first-to-second object correlation storage, transmit a first event notification to an event handler; and wherein the second-to-first correlation storage engine is further configured to: in response to populating or updating the second-to-first object correlation storage, transmit a second event notification to the event handler.

Another aspect of the specification provides a method comprising: at a first-to-second correlation engine: determining correlations between first objects, as received via a first object feed, and second objects as stored at a second object storage; and generating first correlation messages indicative of the correlations for both a first-to-second object direction and a second-to-first object direction; at a second-to-first correlation engine: determining respective correlations between the second objects, as received via a second object feed, and the first objects as stored at a first object storage; and generating second correlation messages indicative of the respective correlations for both the second-to-first object direction and the first-to-second object direction; at a first-to-second correlation storage engine: receiving the first correlation messages and the second correlation messages for the first-to-second object direction; and one or more of populating and updating a first-to-second object correlation storage based on received correlation messages; and at a second-to-first correlation storage engine: receiving the first correlation messages and the second correlation messages for the second-to-first object direction; and one or more of populating and updating a second-to-first object correlation storage based on respective received correlation messages.

The method can further comprise, at the first-to-second storage engine: in response to storing an updated first-to-second object correlation at the first-to-second object correlation storage, transmitting, to the second-to-first storage engine, a command to remove an existing second-to-first object correlation at the second-to-first object correlation storage, the existing second-to-first object correlation corresponding to a first-to-second object correlation that is one or more of removed and updated by the updated first-to-second object correlation.

The method can further comprise, at the second-to-first storage engine: in response to storing an updated second-to-first object correlation at the second-to-first object correlation storage, transmitting, to the first-to-second storage engine, a command to remove an existing first-to-second object correlation at the first-to-second object correlation storage, the existing first-to-second object correlation corresponding to a second-to-first object correlation that is one or more of removed and updated by the updated second-to-first object correlation.

The method can further comprise, at a first object feed engine: receiving the first objects from the first object feed; storing the first objects at the first object storage; and providing the first objects to the first-to-second correlation engine.

The method can further comprise, at a second object feed engine: receiving the second objects from the second object feed; storing the second objects at the second object storage; and providing the second objects to the second-to-first correlation engine.

The method can further comprise, at the first-to-second storage engine, populating or updating the first-to-second object correlation storage based on the received correlation messages by one or more of: storing, at the first-to-second object correlation storage, a new first-to-second correlation indicated by the received correlation messages; adding, at the first-to-second object correlation storage, to an existing first-to-second correlation, an additional first-to-second correlation indicated by the received correlation messages; and replacing, at the first-to-second object correlation storage, the existing first-to-second correlation with an updated first-to-second correlation indicated by the received correlation messages.

The method can further comprise, at the second-to-first storage engine, populating or updating the second-to-first object correlation storage based on the respective received correlation messages by one or more of: storing, at the second-to-first object correlation storage, a new second-to-first correlation indicated by the respective received correlation messages; adding, at the second-to-first object correlation storage, to an existing second-to-first correlation, an additional second-to-first correlation indicated by the respective received correlation messages; and replacing, at the second-to-first object correlation storage, the existing second-to-first correlation with an updated second-to-first correlation indicated by the respective received correlation messages.

The first objects and the second objects can respectively comprise different ones of passenger name records, ticket data, schedule data, inventory data; customer management data, baggage and history data, crew data, flight management data, revenue accounting data, loyalty data, customer experience data, and customer relationship data.

The method can further comprise: at the first-to-second correlation storage engine, in response to populating or updating the first-to-second object correlation storage, transmitting a first event notification to an event handler; and at the second-to-first correlation storage engine, in response to populating or updating the second-to-first object correlation storage, transmitting a second event notification to the event handler.

BRIEF DESCRIPTIONS OF THE DRAWINGS

Embodiments are described with reference to the following figures, in which.

Figure 3:
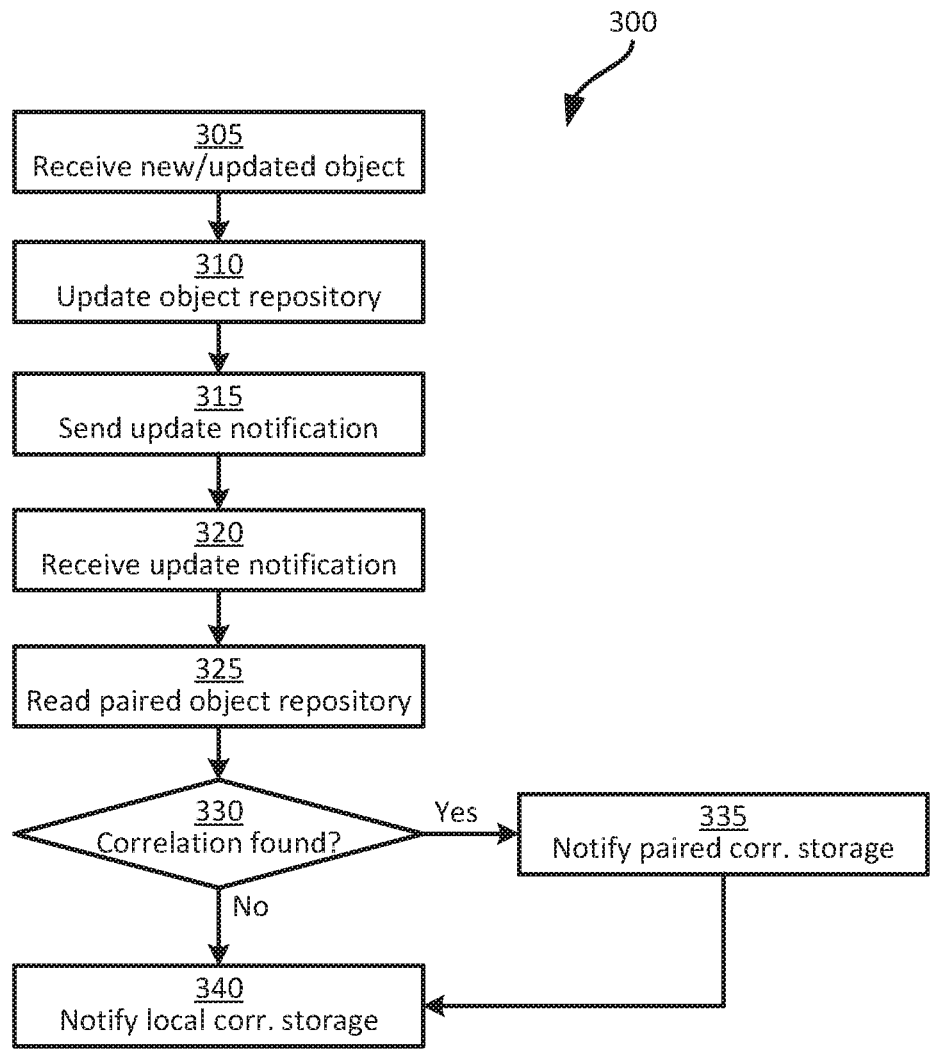
FIG. 3 depicts a method of updating data object repositories and detecting object correlations in the system of FIG. 1.
Figure 5:
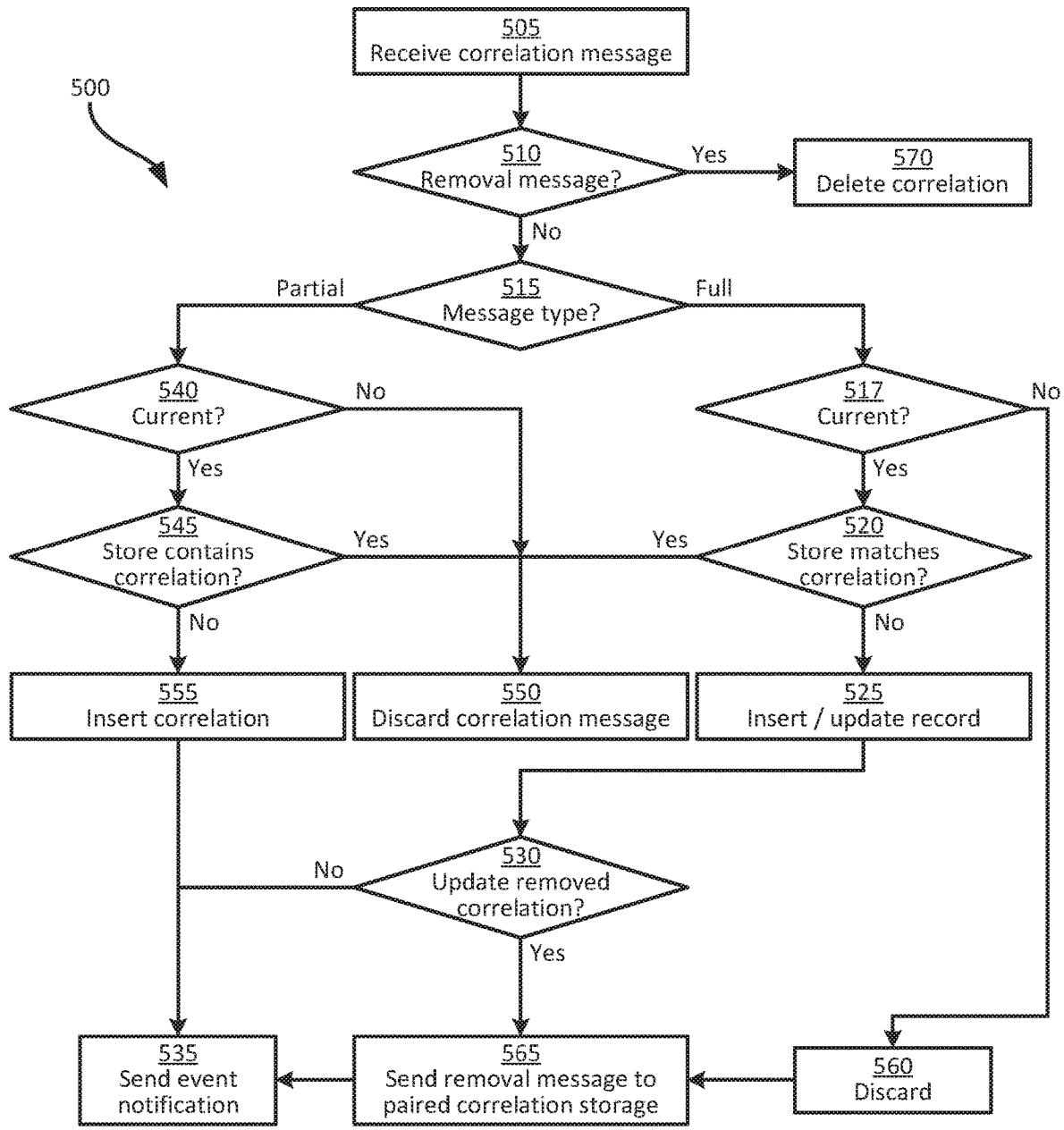
Figure 6A:
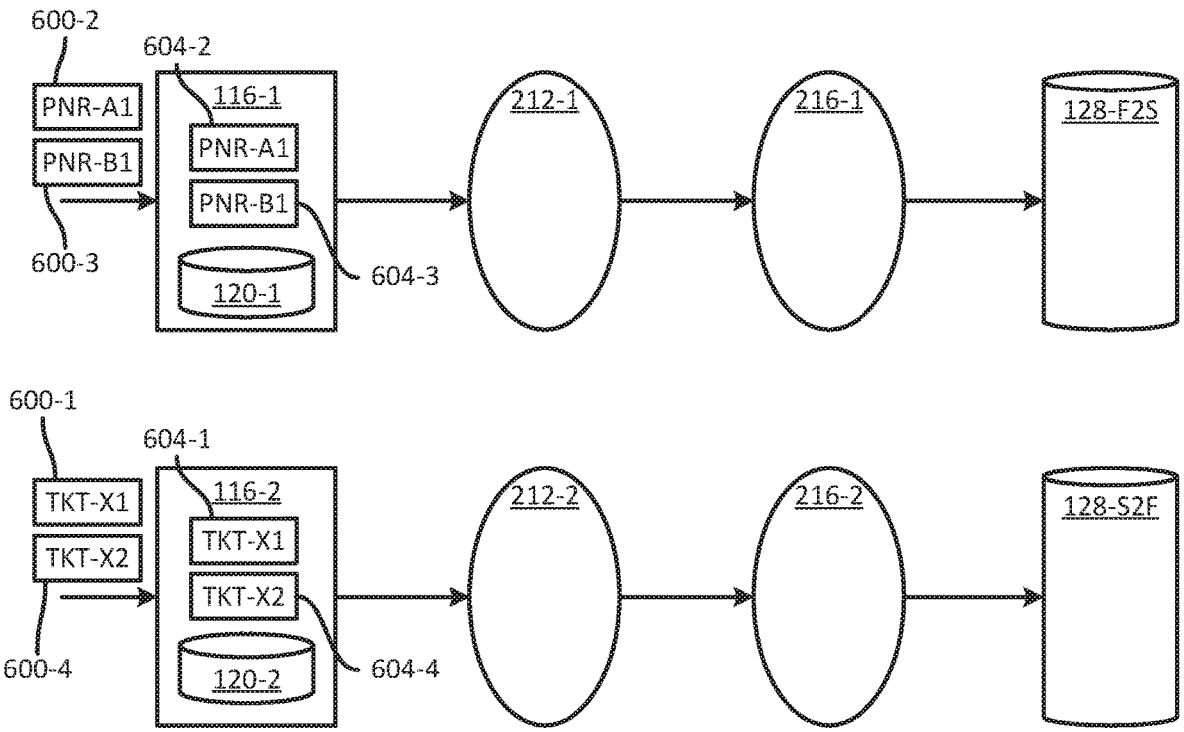
Figure 6B:
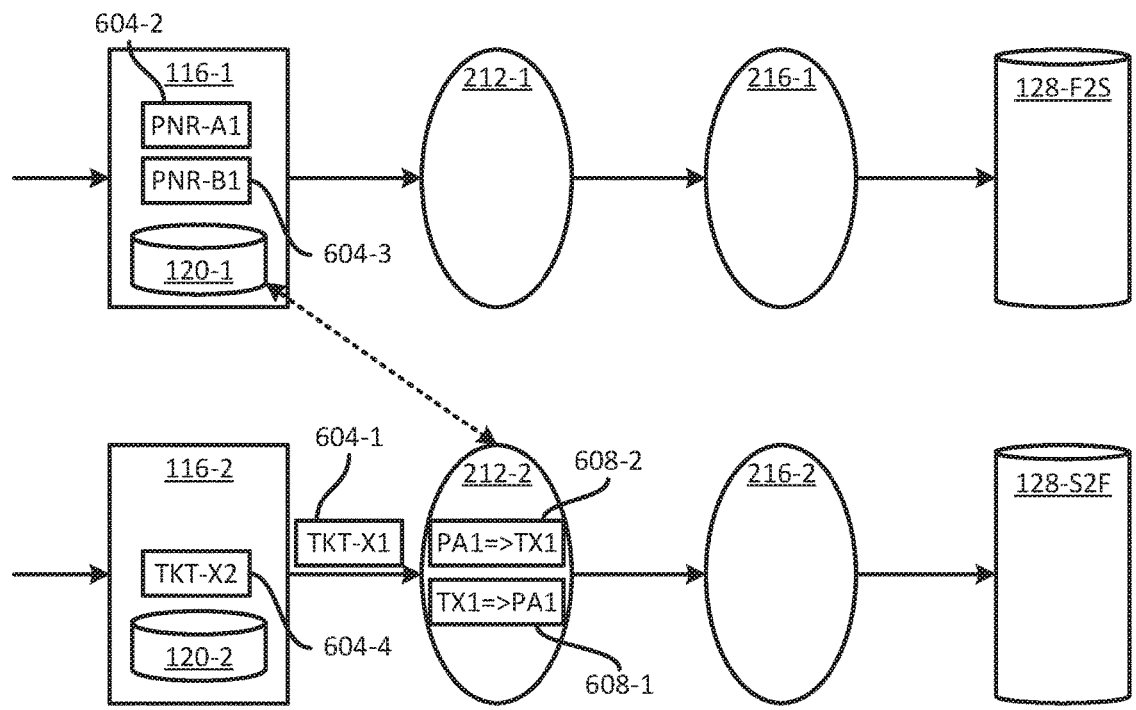

FIGS. 4A, 4B, 4C, and 4D depict an example performance of the method of FIG. 3;

FIG. 5 depicts a method of processing correlation messages resulting from the performance of the method of FIG. 3;

FIGS. 6A and 6B depict example performances of the methods of FIG. 3 and

FIG. 5.

Figure 7A:
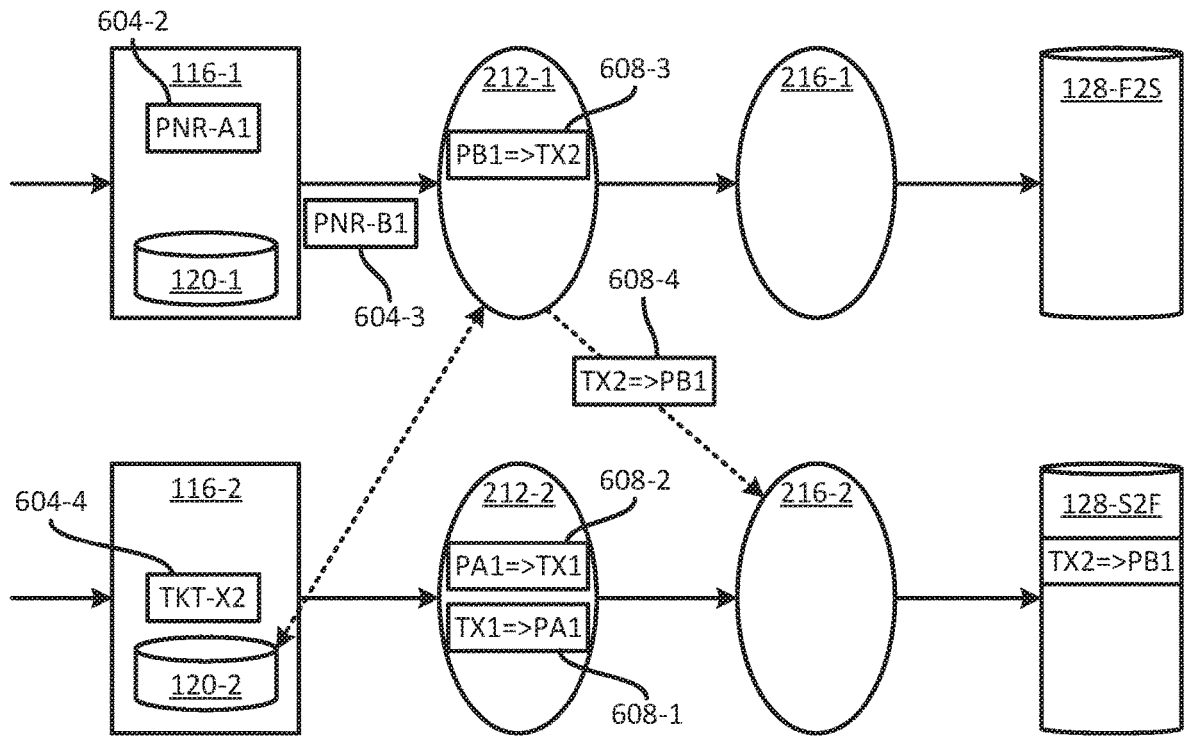
Figure 7B:
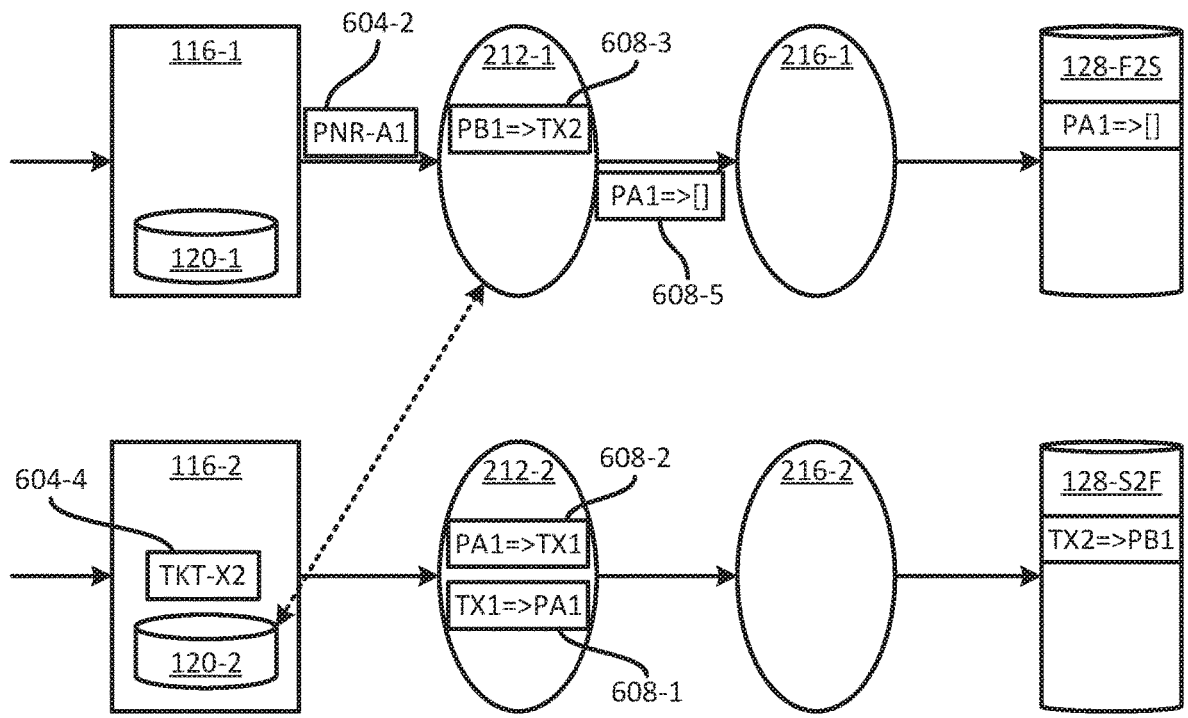

FIGS. 7A and 7B depict example performances of the methods of FIG. 3 and FIG. 5.

Figure 8A:
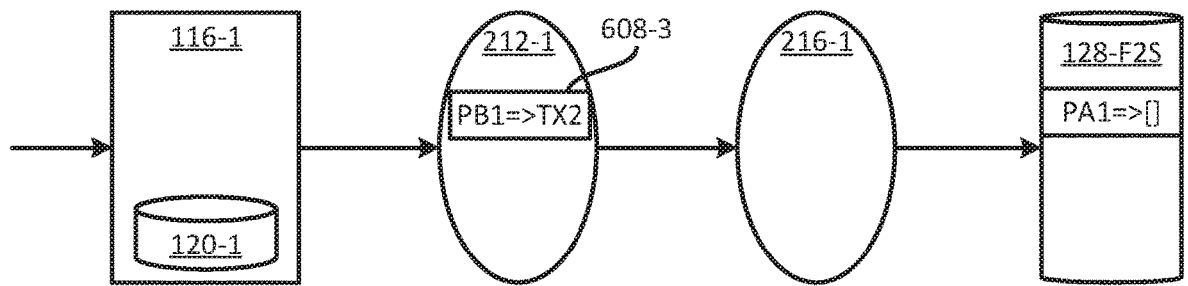
Figure 8A:
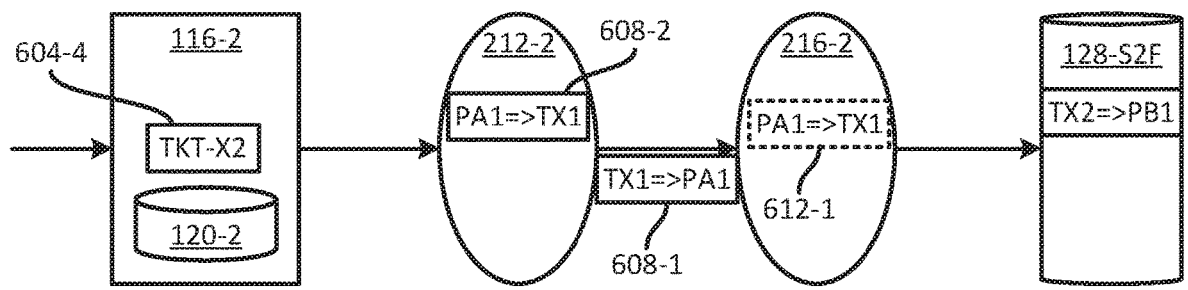
Figure 8B:
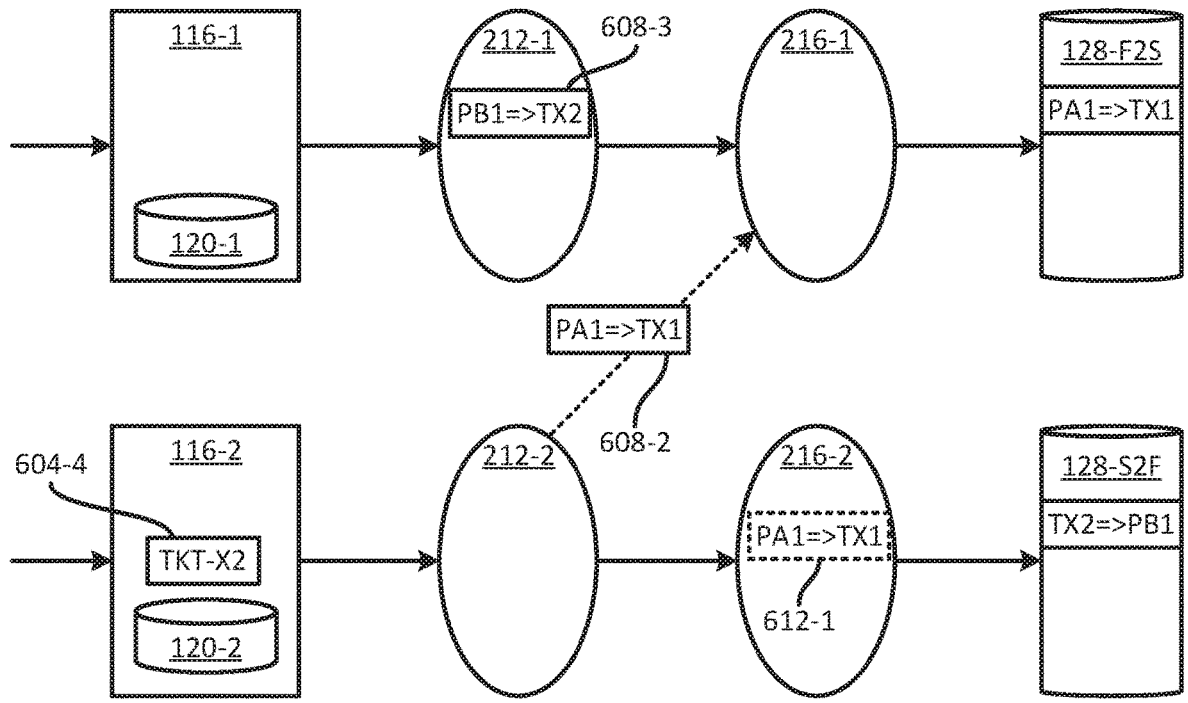

FIGS. 8A and 8B depict example performances of the methods of FIG. 3 and FIG. 5.

Figure 9A:
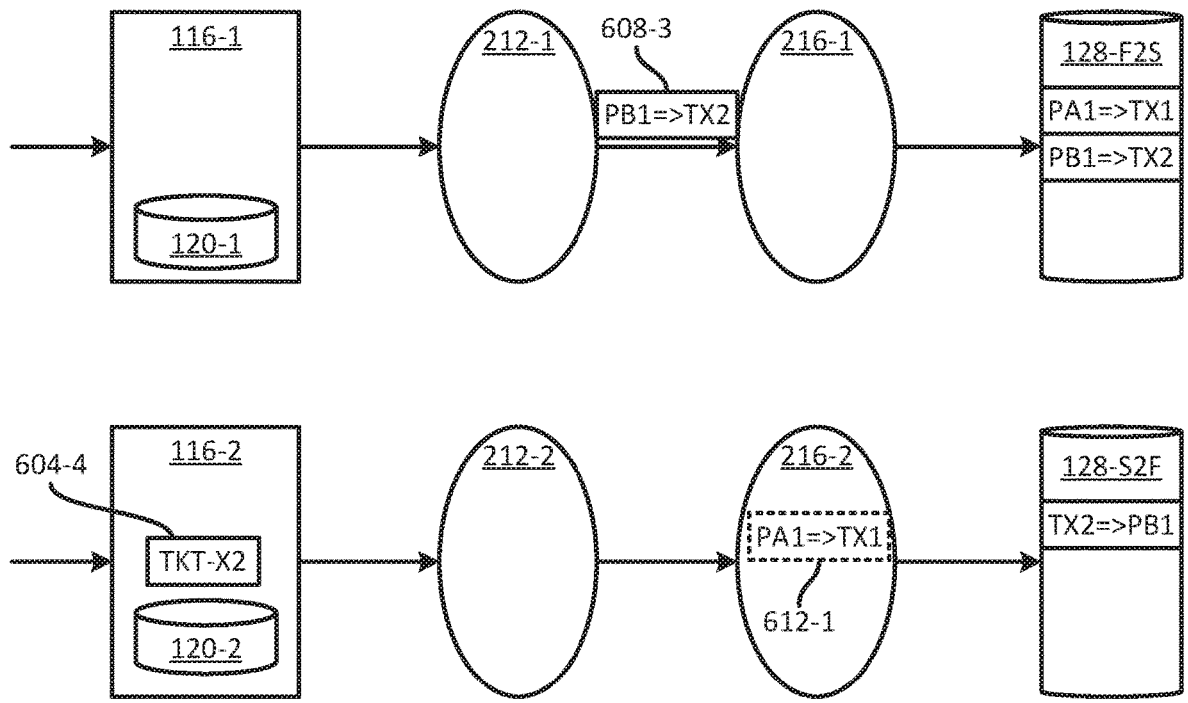
Figure 9B:
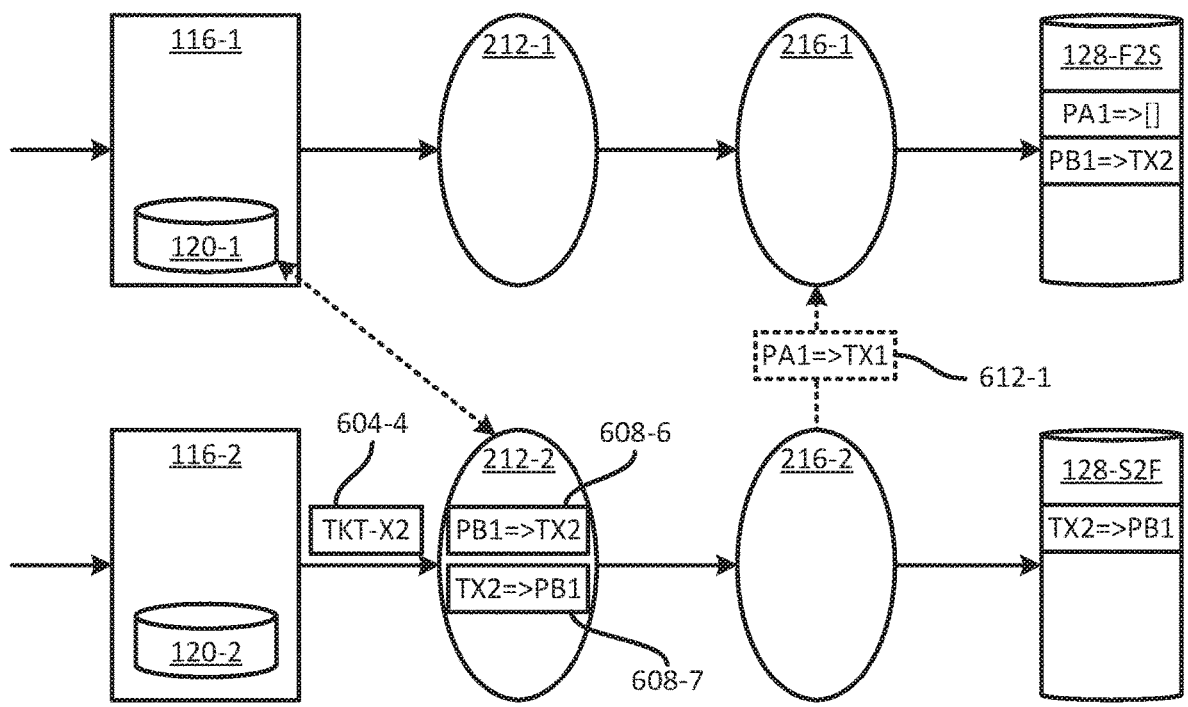

FIGS. 9A and 9B depict example performances of the methods of FIG. 3 and FIG. 5.

DETAILED DESCRIPTION

Figure 1:
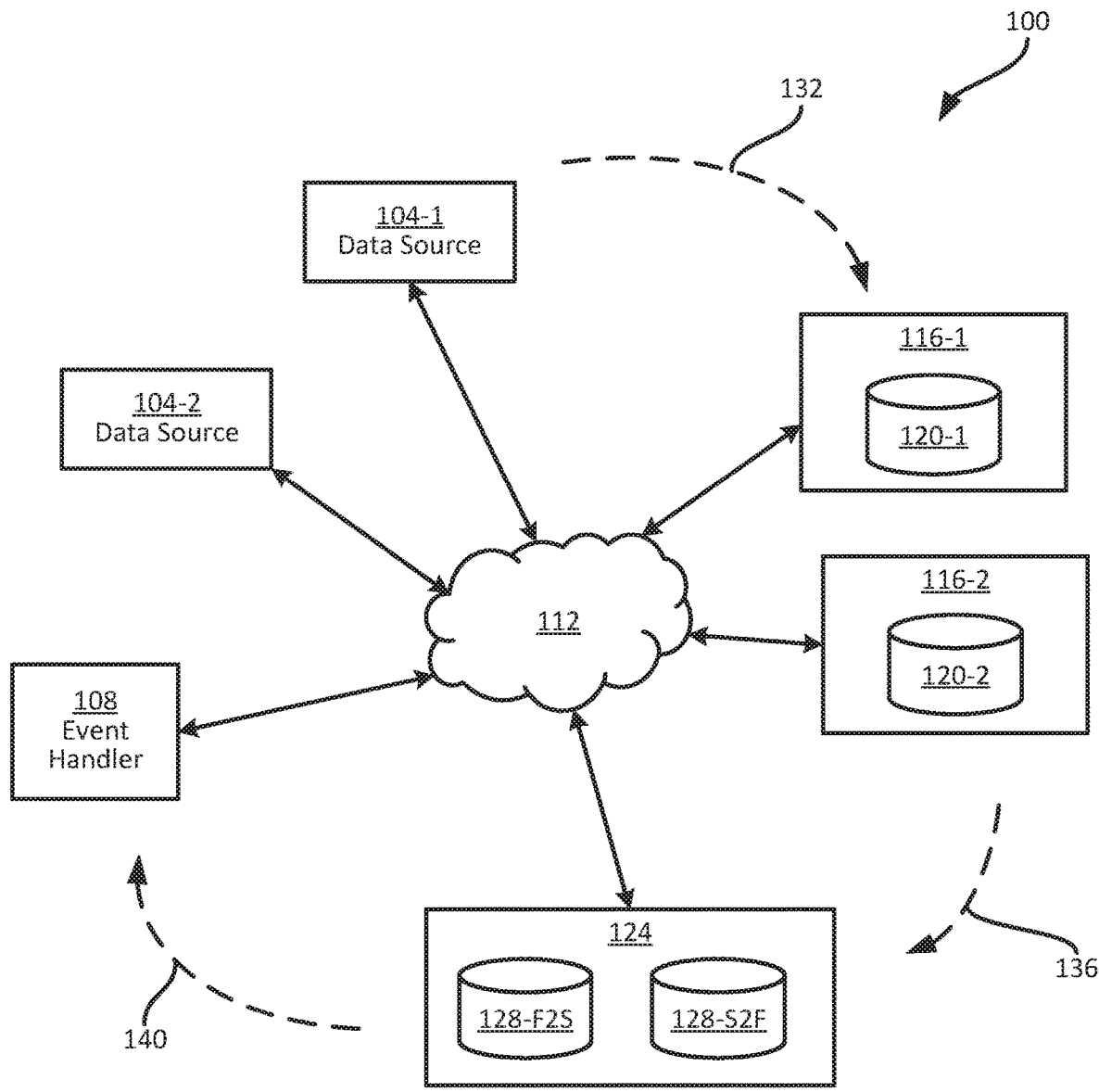
FIG. 1 depicts a system for data object correlation.

FIG. 1 depicts a system 100 for detecting correlations between data objects. The system 100 includes at least one source of two different types of such data objects, also referred to as a data source. Two example data sources 104-1 and 104-2 are illustrated in FIG. 1 (referred to collectively as data sources 104, and generically as a data source 104; similar nomenclature is also used for other components herein). The data sources 104 can be computing devices or systems of computing devices. The particular activities performed at the data sources 104 are not particularly limited. For the purposes of the present discussion, each data source 104 generates and/or updates data objects of a specific type, according to any suitable internal mechanism for initiating object generation or updating.

That is, the data source 104-1 generates and/or updates data objects of a first type, and the data source 104-2 generates and/or updates data objects of a second type. This arrangement is presented for simplicity of illustration. In other examples, each data source 104 may generate and/or update data objects of either type. Further, the system 100 can include additional data sources 104, beyond those shown in FIG. 1. More generally, one or more data sources 104 in the system 100 generate and/or update at least two types of data objects. As will be apparent in the discussion below, the system 100 serves to detect and store correlations between pairs of data object types. When the system 100 includes sources for more than two types of data objects, correlations remain pair-wise, and thus the elements and method steps described below may be repeated for each pair.

The data objects can have a wide variety of data structures (e.g. file formats), and can contain a wide variety of types of data. In the examples discussed below, the first type of data object is a passenger name record (PNR) containing data that defines a travel itinerary. The PNR may contain data identifying one or more travelers, as well as data defining one or more flights, hotel bookings, car rental reservations, or the like. As will be apparent to those skilled in the art, a variety of other data may also be contained in a PNR.

The second type of data object discussed in the examples below is an electronic ticket, or e-ticket. The e-ticket contains data defining a purchased travel service or product, such as a flight. As will now be apparent to those skilled in the art, e-tickets and PNRs may contain overlapping information, and there typically exist correlations between PNRs and e-tickets. That is, a given PNR may be correlated with one or more e-tickets, in that the PNR defines an itinerary that includes flights to which the e-tickets correspond. The e-tickets, in turn, are therefore correlated with that PNR; that is, the correlation is bi-directional. The correlation between the PNR and the e-ticket lies in the fact that the two documents are associated with the same products or services. A wide variety of other data object types are also contemplated. For example, data objects containing flight schedule data may also be processed by the system 100, for example to detect correlations between scheduling data and PNR data, and/or to detect correlations between scheduling data and e-ticket data, in addition to the e-ticket/PNR correlations mentioned above.

As will also be apparent, the creation and updating of PNRs and e-tickets can be performed by different entities (the data sources 104). Indeed, the PNRs, for example, may be updated by the a number of parties (e.g. both data sources 104), such as a travel agency system, an airline computing system, and the like.

Other components of the system 100 may rely on the above-mentioned correlation between first and second types of data records (e.g. between the PNRs and e-tickets mentioned above). In the illustrated example, the system 100 includes an event handler 108, which may be implemented as one or more computing devices connected to a network 112 (to which the data sources 104 are also connected). The event handler 108 receives notifications of correlations between data objects of the first and second types, as well as notifications of other events (e.g. from the data sources 104 themselves and/or from other computing devices).

The event handler 108, in response to such notifications, can perform any of a wide variety of actions based on such notifications. When the data objects are PNRs and schedule data, for example, the event handler 108 can generate a notification to a travel agency or directly to a traveler upon detecting that a schedule change to a flight has occurred. The schedule change may be received at the event handler 108 in the form of a notification from an airline server (not shown), and may include an itinerary identifier (e.g. an alphanumeric string) as well as an updated departure time or any other suitable scheduling information. To generate the appropriate notifications, the event handler 108 is required to determine which PNRs (which contain or refer to contact information to travelers or their agents) are associated with the altered e-ticket.

In other examples, the event handler 108 may, upon receiving a PNR containing passenger information, detect language requirements, accessibility requirements or the like of the passenger, and determine based on aircraft and crew attributes (which may be retrieved using data in the e-ticket; in other embodiments, crew attributes may be stored in yet another type of data object, which may be correlated with PNR data according to the mechanisms described herein) whether changes to staffing of aircraft equipment are required. The event handler 108, in other words, must be aware of the correlations between PNRs and e-tickets.

Detecting correlations between PNRs and e-tickets, and indeed between any data objects of a first type and a second type, is complicated by the nature of creation and updating of the data objects. Specifically, the data objects of the first type and data objects of the second type can be generated and/or updated at any time. Further, notifications of such updates are not necessarily received at a correlating component of the system 100 in the same order as the notifications were generated. The order in which such messages are generated and received can be affected by the timing of events at the data sources, latency arising from multi-threading or any other distribution of computational resources (e.g. across multiple cores, multiple geographic locations, or the like) at the data sources during the generation of updates to data objects, network latency in the delivery of the notifications, and the like.

In some systems, correlation of data objects is performed by a central correlation component such as a server configured to receive updated data objects from both data sources 104. The correlation component then attempts to discover correlations between the data objects. The correlation component may be implemented to process incoming data object updates in a single thread, but scaling the correlation component to handle increasing volumes of data object updates may become prohibitively costly. If the correlation component is distributed to improve scalability, the correlation component may be vulnerable to various race conditions, however, in which the order in which update notifications for data objects are received affects the outcome of correlation detection. That is, because the order in which a given set of data object update notifications are received in a distributed system is typically impossible for the correlation component to predict, some of the detected correlations may be incorrect, leading to incorrect system behaviour (e.g. at the event handler 108). In addition, performing correlation detection at a centralized correlation component as noted above can lead to excessive computational demands, particularly when additional types of data objects must be correlated (i.e. beyond the two examples mentioned above).

The system 100, in contrast to a single, centralized correlation component as mentioned above, includes a set of other components connected to the network 112 that detect correlations between data objects of different types, and notify the event handler 108 of the correlations. More specifically, although the correlations between data objects are bidirectional (that is, if a given PNR is correlated with a given e-ticket, then by definition that e-ticket is correlated with the PNR), the other components of the system 100 detect separate, unidirectional correlations that together represent a bidirectional correlation between data objects. These components also implement certain functionality to render the system 100 robust against certain race conditions, such that over time, correct correlations are detected regardless of the order and timing with which notifications of updates to data objects are received.

Before a discussion of further components of the system 100, it will be understood that the use of PNRs and e-tickets as example data object types in the discussion below is for illustrative purposes only. As will be apparent in the discussion below, the system 100 can be deployed to detect correlations between data objects of any of a wide variety of types. Other examples of data object types include objects containing any one or more of inventory data, customer management data, baggage and history data, crew data, flight management data, revenue accounting data, loyalty data, customer experience data, and customer relationship data.

The additional components of the system 100 mentioned above include first and second storage nodes 116-1 and 116-2, which may also be referred to as object feed engines. The storage nodes 116 receive raw data from the data sources 104 defining new or updated data objects, apply any required parsing, transformation, or the like to the raw data and store the parsed data in respective data object repositories 120-1 and 120-2. In other words, the storage nodes 116 are responsible for maintaining current versions of the data objects. In particular, the storage node 116-1 maintains current versions of the data objects of the first type (e.g. PNRs), and the storage node 116-2 maintains current versions of the data objects of the second type (e.g. e-tickets). When a data object is updated in a repository 120, the corresponding storage node 116 generates a notification for transmission via the network 112 to a correlation subsystem 124. The subsystem 124 is shown in FIG. 1 as being implemented on a single computing device (e.g. a server, or a collection of physical servers implementing one logical server), but as will be apparent in the discussion below, certain components of the subsystem 124 are modular and can therefore be deployed as independent computing devices.

The subsystem 124 includes two distinct correlation repositories 128. The first repository 128-F2S contains "first-to-second" correlations. That is, in the example in which the data records include PNRs and e-tickets, the repository 128-F2S contains indications, for each PNR, of which e-tickets are correlated with that PNR. The repository 128-S2F contains "second-to-first" correlations, which in the present example means, for each e-ticket, which PNRs are correlated with that e-ticket. Thus, as noted above, rather than track bidirectional correlations in a single repository, the subsystem 124 tracks two sets of unidirectional correlations. Subcomponents of the subsystem 124 interact with one another to maintain the repositories 128-F2S and 128-S2F, and to ensure agreement between the repositories 128-F2S and 128-S2F. That is, the subsystem 124 provides eventual consistency between the repositories 128 and, when such consistency is reached, correct correlations.

The discussions below revolve around the system 100 as illustrated in FIG. 1. In other embodiments, however, the number of data object types can be greater than two, and the number of correlations to track can therefore also be higher. In such embodiments, the number of data sources 104 may vary, as may the number of storage nodes 116. For each pair of data objects to be correlated, a distinct subsystem 124 may be deployed. Thus, for example, in a system in which four types of data objects must all be correlated with each other, six instances of the subsystem 124 may be implemented.

To summarize, the data sources 104 generate raw data defining updates to data objects of various types. The raw data is obtained by the storage nodes 116 via the network 112 (illustrated via a simplified path 132), which update the repositories 120 with the current versions of the relevant data objects. The storage nodes 116 generate notifications of changes to data objects, for delivery to the subsystem 124 via the network 112 (as illustrated via a simplified path 136). The subsystem 124, in turn, detects correlations between data objects and notifies the event handler 108 via the network 112 (as illustrated via a simplified path 140), for subsequent processing.

Figure 2:
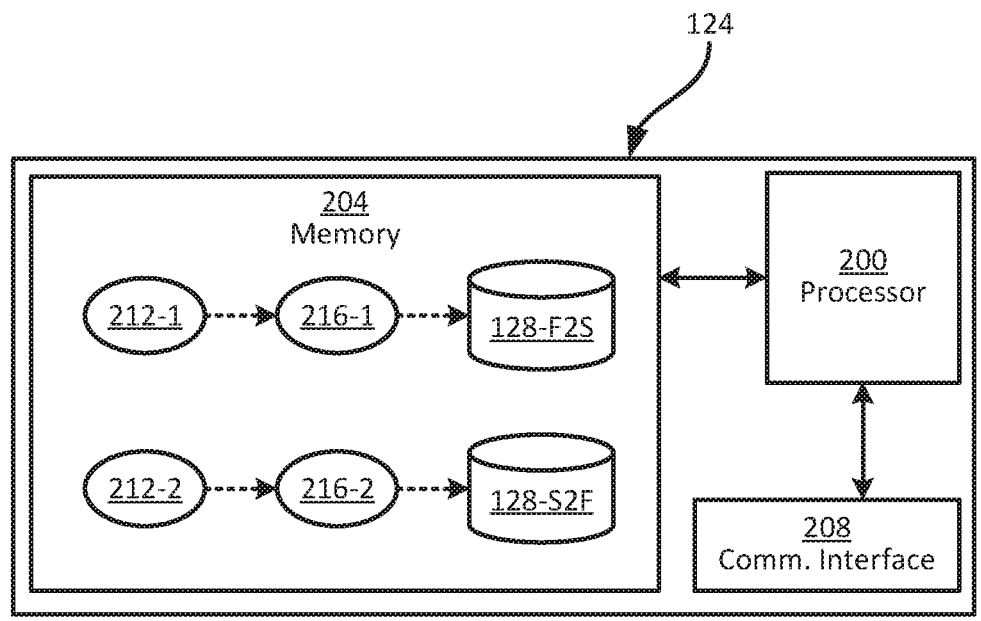
FIG. 2 depicts certain components of the correlation subsystem of FIG. 1.

Turning to FIG. 2, certain components of the subsystem 124 will be described in greater detail, before a discussion of the actions performed by the components of the subsystem 124 to detect correlations between data objects.

As shown in FIG. 2, the subsystem 124 includes at least one processor 200, such as a central processing unit (CPU) or the like. The processor 200 is interconnected with a memory 204, implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The processor 200 and the memory 204 are generally comprised of one or more integrated circuits (ICs).

The processor 200 is also interconnected with a communication interface 208, which enables the server 124 to communicate with the other computing devices of the system 100 via the network 112. The communication interface 208 therefore includes any necessary components (e.g. network interface controllers (NICs), radio units, and the like) to communicate via the network 112. The specific components of the communication interface 208 are selected based on the nature of the network 112. The subsystem 124 can also include input and output devices connected to the processor 200, such as keyboards, mice, displays, and the like (not shown).

The components of the subsystem 124 mentioned above can be deployed in a single enclosure, or in a distributed format. In some examples, therefore, the subsystem 124 includes a plurality of processors, either sharing the memory 204 and communication interface 208, or each having distinct associated memories and communication interfaces.

The memory 204 stores the repositories 128 mentioned above in connection with FIG. 1. The memory 204 also stores a plurality of computer-readable programming instructions, executable by the processor 200, in the form of various applications. In particular, the memory 204 stores a distinct set of applications for each repository 128. In the present example, therefore, the memory 204 stores two sets of applications. Each set includes a correlation application 212, also referred to as a correlation engine 212 or simply as a correlator 212. Each set also includes a correlation storage engine 216. In the description below, the processor 200, and more generally the subsystem 124, are said to be configured to perform certain actions. It will be understood that they are so configured via the execution (by the processor 200) of the instructions of the applications stored in memory 204.

The correlators 212 detect unidirectional correlations based on notifications received from the storage nodes 116, as will be discussed in greater detail below. In the present example, the correlator 212-1 detects correlations from PNRs to e-tickets (i.e. which e-tickets are correlated with each PNR), and the correlator 212-2 detects correlations from e-tickets to PNRs (i.e. which PNRs are correlated with each e-ticket). The correlators 212, upon detection of a correlation, send correlation messages to the correlation storage engines 216. As will be seen below, each correlator 212 may generate correlation messages for transmission to both its "local" correlation storage engine 216, and the "remote" or "paired" correlation storage engine 216. That is, the correlator 212-1 may generate correlation messages for delivery to both the correlation storage engine 216-1 and the correlation storage engine 216-2.

The correlation storage engines 216, in turn, process received correlation messages in order to update the correlation repositories 128. In particular, the correlation storage engine 216-1 updates the repository 128-F2S, while the correlation storage engine 216-2 updates the repository 128-S2F. The correlation storage engines 216 may also, under certain conditions, exchange messages directly with one another, to mitigate the storage of outdated correlations resulting from the race conditions mentioned earlier. In addition, the correlation storage engines 216 generate event notifications for delivery to the event handler 108, e.g. via the communications interface 208.

Turning now to FIG. 3, certain aspects of the operation of the system 100 will be described in greater detail. Specifically, FIG. 3 illustrates a method 300 of updating the repositories 120 and detecting correlations between data objects. The method 300 will be described in conjunction with its performance within the system 100. In particular, certain blocks of the method 300 are performed at the storage nodes 116, and other blocks of the method 300 are performed at the subsystem 124, via execution of the correlators 212.

The first portion of the method 300, consisting of blocks 305 to 315, is performed by the storage nodes 116. That is, each storage node 116 performs an independent instance of blocks 305 to 315 to process any data received from the data sources. Further, each storage node 116 can perform multiple instances of blocks 305-315 in parallel (though not necessarily beginning and ending at the same time), as a result of multiple notifications being received from the data sources 104.

At block 305, a storage node 116 receives, from a data source 104, raw data defining a new data object or an update to an existing data object. For example referring briefly to FIG. 4A, two instances of block 305 are illustrated, with the storage nodes 116-1 and 116-2 receiving respective messages 400-1 and 400-2 containing raw data (e.g. from the data sources 104-1 and 104-2, respectively) defining new data objects. The messages 400-1 may be received simultaneously, or at different times. More generally, there need not be any causal link between the times of receipt of the messages 400-1 and 400-2. Although the data received at the storage nodes 116 is referred to above as raw data, it may also have been formatted prior to receipt at the storage nodes 116 to conform with any suitable data model.

At block 310, each storage node 116 updates the corresponding object repository 120 based on the raw data received at block 305. For example, the raw data may be parsed to detect any suitable predefined data structure; the corresponding repository 120 may be searched to determine whether the raw data represents a new data object or an update to an existing data object, and the like. Table 1, below, illustrates example contents of the repositories 120-1 and 120-2 before and after a performance of blocks 305 and 310 at each of the storage engines 116.

TABLE 1

| Content of Repositories 120 | | |
|---|---|---|
| | Previous Content | Current Content |
| Repository 120-1 | — | PNR-A1 |
| Repository 120-2 | — | TKT-X1 |

In the example shown above, the repositories 120 are assumed to initially be empty. The message 400-1 defines a new PNR, referred to as PNR-A1 (meaning a first version of PNR-A). The message 400-2 defines a new e-ticket, referred to as TKT-X1 (meaning a first version of TKT-X).

Figure 4A:
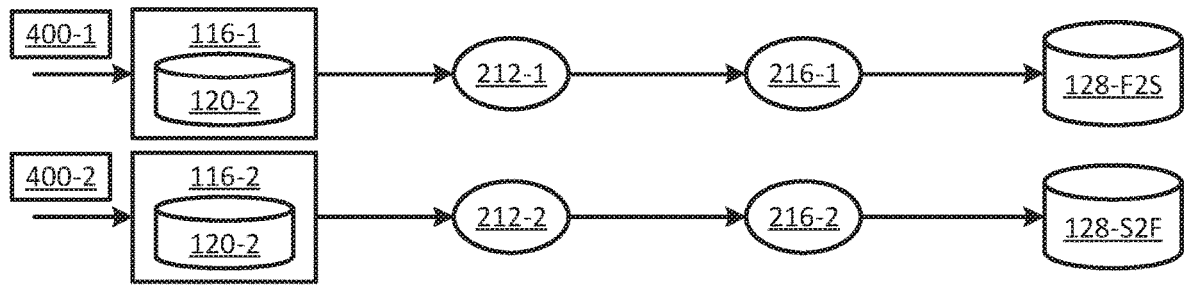
Figure 4B:
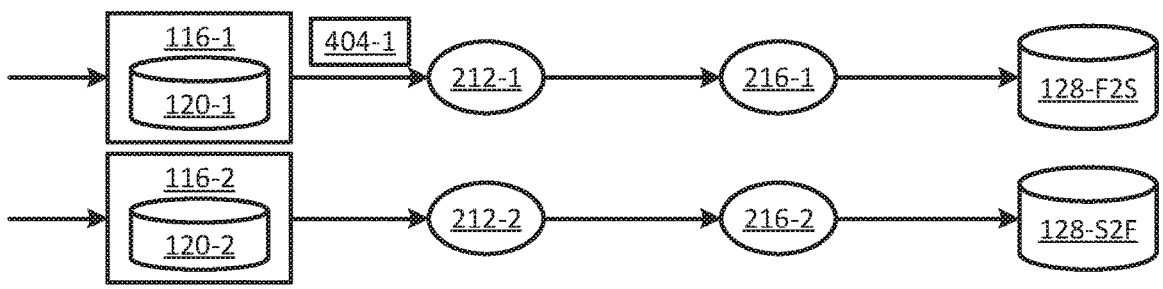

At block 315, responsive to updating the corresponding repository 120, each storage node 116 transmits a notification to the subsystem 124, and specifically to the corresponding correlator 212. Thus, as shown in FIG. 4B, the storage node 116-1 transmits a notification 404-1 to the correlator 212-1, and the storage node 116-2 transmits a notification 404-2 to the correlator 212-2. The notifications 404 can be delivered via any suitable mechanism (e.g. a queue for each correlator 212, which may also be referred to as a data object feed). The notifications 404 can contain some or all of the data in the objects stored in the repositories 120 via the performance of block 310.

Figure 4C:
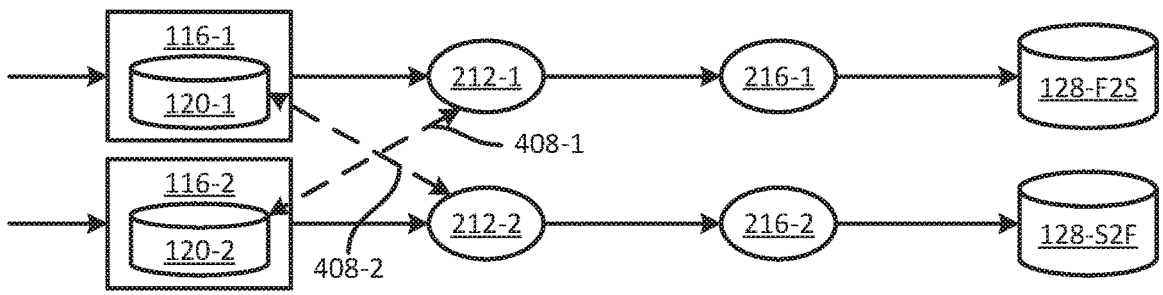

Returning to FIG. 3, the remaining blocks of the method 300 are performed by the correlators 212. As noted above in connection with the storage nodes 116, each correlator 212 performs an independent instance of blocks 320 to 340, and such instances need not be temporally linked. At block 320, each correlator 212 receives the notification 404 mentioned above in connection with block 315. At block 325, the correlator 212 requests data from the paired object repository 120 (as distinguished from the local repository). That is, as shown in FIG. 4C, the correlator 212-1 requests data from the repository 120-2 by sending a request 408-1 to the storage node 116-2, and the correlator 212-2 requests data from the repository 120-1 by sending a request 408-2 to the storage node 116-1.

The purpose of the requests 408 is to discover whether the paired repository 120 contains data objects that are correlated with the data object defined in the message received at block 320. Thus, the correlator 212-1 seeks to discover whether the repository 120-2 contains e-ticket data objects that are correlated with PNR-A1, and the correlator 212-2 seeks to discover whether the repository 120-1 contains PNR data objects that are correlated with TKT-X1. The nature of the requests 408 are not particularly limited, and the correlators 212 can perform any of a wide variety of operations to detect correlations. Examples of such operations can be querying the paired repository 120 for records containing an identifier that is expected to be present in both types of data records. For some types of data objects, however, common identifiers may not be present in the data objects to be correlated, and correlation is therefore a more complex process. Correlation may involve, for example, the retrieval of sets of identifiers from each data record (none of which necessarily appear explicitly in the other data record) and the application of various correlation algorithms.

Returning to FIG. 3, following the retrieval of data from the paired repository 120 and detection of correlations therein (if any), the correlator 212 proceeds to block 330. At block 330, the correlator 212 determines whether any correlations were detected at block 325. In the present example, it assumed that the correlator 212-1 determines at block 325 that the e-ticket TKT-X1 is correlated with PNR-A1, and that the correlator 212-2 determines at block 325 that the PNR PNR-A1 is correlated with TKT-X1. The determination at block 330 is therefore affirmative for both correlators 212, and both correlators 212 proceed to block 335. When the determination at block 330 is negative, block 335 is bypassed, and the correlator 212 proceeds directly to block 340.

At block 335, each correlator 212, upon detecting a correlation at block 325, sends a message to the paired correlation storage engine 216 (i.e, the "remote" correlation storage engine 216) to notify the paired correlation storage engine 216 of the reverse of the correlation detected at block 325. As noted above, correlations between data objects are bidirectional, but the subsystem 124 detects and tracks each bidirectional correlation as two related unidirectional correlations. Therefore, if at block 325 the correlator 212-1 detected a correlation expressed as PNR-A1=>TKT-X1, at block 335 the correlator 212-1 sends a message to the correlation storage engine 216-2 indicating a correlation expressed as TKT-X1=>PNR-A1. Likewise, if at block 325 the correlator 212-2 detected a correlation expressed as TKT-X1=>PNR-A1, at block 335 the correlator 212-2 sends a message to the correlation storage engine 216-1 indicating a correlation expressed as PNR-A1=>TKT-X1.

Figure 4D:
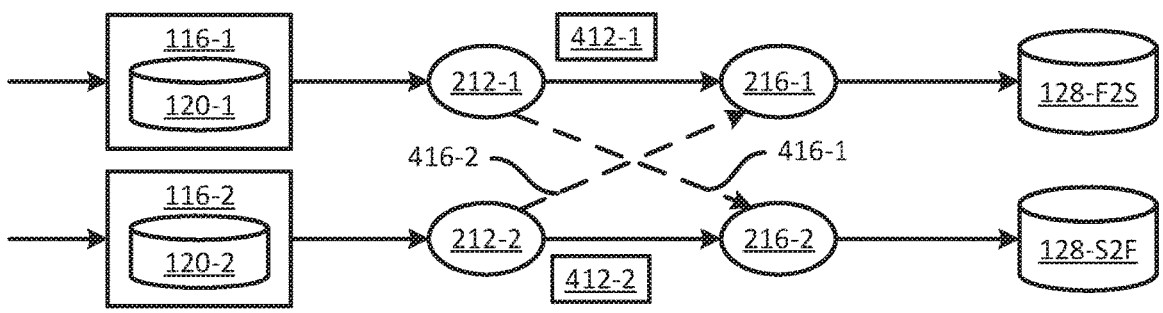

Following the transmission of notification messages at block 335, the correlators 212 proceed to block 340, at which each correlator also notifies its local correlation storage engine 216 of the correlation in the direction detected at block 325. Thus, in the example of FIGS. 4A-4C, the correlator 212-1 sends a message to the correlation storage engine 216-1 defining the correlation PNR-A1=>TKT-X1, and the correlator 212-2 sends a message to the correlation storage engine 216-2 defining the correlation TKT-X1=>PNR-A1. FIG. 4D illustrates the messages sent at blocks 335 and 340. In particular, the correlators 212-1 and 212-2 send respective messages 412-1 and 412-2 to the paired correlation storage engines 216-2 and 216-1, and also send respective messages 416-1 and 416-2 to the local correlation storages 216-1 and 216-2.

The messages sent at block 335 are referred to as partial messages, while the messages sent at block 340 are referred to as full, or complete, messages. The full messages 516 are so named because each message 516 is expected (barring a failure by a correlator 212 to detect a correlation) to represent the entire set of unidirectional correlations that apply to the relevant data object. The partial messages 512, on the other hand, are so named because each partial message 512 cannot necessarily be expected to represent an entire set of unidirectional correlations. As an illustrative example, consider a scenario in which the repository 120-1 contains three data objects, PNR-A1, PNR-B1 and PNR-C1 (i.e., three distinct PNRs), and in which the repository 120-2 contains two data objects, TKT-X1 and TKT-Y1. PNR-A1 is correlated with both e-ticket objects, while the e-ticket TKT-X1 is correlated only with PNR-A1. When the correlator 212-2 detects the correlation TKT-X1=>PNR-A1, that correlation represents the entire set of correlations in the direction of e-tickets to PNRs. However, because the search for correlations began with the object TKT-X1, it cannot detect the correlation between PNR-A1 and TKT-Y1. The correlator 212-2 thus generates a message indicating that the full set of correlations in the second-to-first direction is TKT-X1=>PNR-A1, and another message indicating that a partial set of correlations in the first-to-second direction is PNR-A1=>TKT-X1. A full message can overwrite all correlations stored in the local repository 128, whereas a partial message does not overwrite, but rather adds to any existing correlations in the paired repository 128.

Following the performance of block 340, the correlators 212 await further messages from the storage nodes 116. Similarly, following the performance of block 315, the storage nodes 116 await further raw data.

In summary, the storage nodes 116 receive and process raw data to update the data object repositories 120, and the correlators 212 receive messages from the storage nodes 116 indicating updates to the repositories 120. Each correlator 212 detects correlations in a specific direction, notifies the local correlation storage engine 216 of that correlation, and also notifies the paired correlation storage engine 216 of the opposite correlation.

As will now be apparent, the partial and full messages generated by the correlators 212 must be processed by the correlation storage engines 216 to update the correlation repositories 128. Referring now to FIG. 5, the functionality of the correlation storage engines 216, also referred to simply as the engines 216 below, will be discussed in greater detail. FIG. 5 illustrates a method 500 of processing correlation messages at the correlation storage engines 216.

As will be apparent from the discussion above, the correlation storage engines 216 receive various messages from both the local correlators 212 and the paired or remote correlators 212 (as well as the other engine 216, as will be seen below). The correlators 212 may have generated such messages based on information that has since been superseded, depending on the timing of receipt of messages from the storage nodes 116. Further, the messages generated by the correlators 212 may be delayed by a wide variety of factors (e.g. network latency, latency introduced by distributed processing, other computational loads at the computing device implementing the correlator 212). The order in which correlation messages are received at a given correlation storage engine 216 from a given correlator 212 is predictable. Specifically, the subsystem 124 is configured to deliver messages from a given correlator 212 to a given correlation storage engine 216 in monotonic increasing order. The order in which the correlation messages are received at a given correlation storage engine 216 from different correlators 212, however, is unpredictable, and the correlation storage engines 216 are therefore configured, as discussed below, to process incoming correlation messages to reduce the likelihood of such unpredictability resulting in the storage of incorrect correlations in the repositories 128.

As noted above in connection with the method 300, distinct instances of the method 500 are performed by each correlation storage engine 216. Each engine 216 performs an instance of the method 500 for each correlation message received. Example performances of the method 500 by the engine 216-1 in response to receipt of the full message 412-1 (from the correlator 212-1) and of the partial message 416-2 (from the correlator 212-2).

At block 505, the engine 216-1 receives a correlation message. In the present example, the engine 216-1 is assumed to receive the "full" message 412-1, specifying the unidirectional correlation PNR-A1=>TKT-X1 (i.e. in the first-to-second direction). At block 510, the engine 216-1 determines whether the message is a removal message. Removal messages are a type of correlation message that is generated not by the correlators, but by the engines 216 themselves. The generation and processing of removal messages will be discussed in greater detail in a later example.

In the present example performance of the method 500, the determination at block 510 is negative, and the engine 216-1 proceeds to block 515.

At block 515, the engine 216-1 determines whether the message is a full or partial message. The type of a correlation message can be indicated implicitly by the origin of the message. For example, when the correlation message received at block 505 is received from the local correlator 212 (i.e. the correlator 212-1 in the case of the engine 216-1), the message is a full message. When, on the other hand, the correlation message received at block 505 is received from the paired correlator (i.e. the correlator 212-2 in the case of the engine 216-1), the message is a paired message. In other examples, the correlation message can contain an explicit indication of its type, such as a flag, header field or the like.

In the present example, the message 412-1 is a full message, and the engine 216-1 therefore proceeds to block 517. At block 517, the engine 216-1 determines whether the correlation message relates to a current version of the relevant data record. For example, the repositories 128 can include version identifiers for each data record represented therein. If the correlation message received at block 505 relates to a version of the data record that is equal to or greater than (i.e. more recent than) the version represented in the repository 128, the determination at block 517 is affirmative. In the present example, the repositories 128 are assumed to be empty initially, and the determination at block 517 is therefore affirmative. The result of a negative determination at block 517 will be discussed in a subsequent example herein.

At block 520, the engine 216-1 determines whether the repository 128-F2S matches the correlation indicated by the message 412-1. The determination at block 520, in the case of a full correlation message, is whether the repository 128-F2S contains a record for the relevant data object (i.e. PNR-A1 in this example) that completely matches the content of the correlation message. In the present example, the repository 128-F2S is assumed to be empty initially, and the determination at block 520 is therefore negative. The engine 216-1 proceeds to block 525, at which the engine 216-1 inserts a record into the repository 128-F2S (i.e. populates the repository 128-F2S), or if the repository 128-F2S already contained a record for the relevant data object, overwrites that record.

In the present example, therefore, the engine 216-1 creates a record in the repository 128-F2S, as shown below in Table 2.

TABLE 2

| Repository 128-F2S | |
| --- | --- |
| Object ID | Correlation(s) |
| PNR-A | PNR-A1 => TKT-X1 |

As seen above, the repository 128-F2S contains one record for the data object PNR-A, which contains any correlations detected by the engine 216-1. The correlations are stored in the record, along with version identifiers. In the present example, the version identifiers are "1" for both data objects.

Following insertion of the record at block 525, the engine 216-1 determines, at block 530, whether the operation at block 525 involved the deletion of any correlations. As will be apparent, overwriting a record responsive to a full correlation message may result in one or more previous correlations being removed. When this happens, the determination at block 530 is affirmative. In the present example, however, no overwriting was necessary because the repository 128-F2S was previously empty. The determination at block 530 is therefore negative, and the engine 216-1 proceeds to block 535. At block 535, the engine 216-1 generates an event notification for transmission to the event handler 108 shown in FIG. 1. The event notification contains data indicating the correlation added to the repository 128-F2S. The event notification can therefore be similar in content to the correlation message received at block 505, although in other examples, as will be seen below, this may not be the case for more complex updates to the repository 128-F2S.

A further example performance of the method 500 will now be discussed for the processing of the partial message 416-2 by the engine 216-1. The message 416-2 defines the unidirectional correlation PNR-A1=>TKT-X1 which is the reverse of the correlation detected by the correlator 212-2, as discussed above in connection with FIGS. 4A-4D.

Following receipt of the message 416-2 at block 505, the determination at block 510 is negative. The determination at block 515 is that the message 416-2 is a partial message. The engine 216-2 therefore proceeds to block 540, at which a similar determination as that at block 517 is performed. The determination at block 540 is affirmative, because the message 416-2 relates to the same version of the PNR-A as currently represented in the repository 128-F2S. Therefore, the engine 216-2 proceeds to block 545 to determine whether the repository 128-F2S contains the correlation in the message 416-2. The determination at block 545 is distinguished from the determination at block 520 in that an exact match is not necessary at block 545. For example, if the repository 128-F2S contains a record defining the correlation from the incoming message, as well as another correlation for the same data object, the determination at block 545 is affirmative.

In the present example, the determination at block 545 is affirmative, because the repository 128-F2S (as shown in Table 2) already contains the correlation indicated by the message 416-2. The engine 216-2 therefore discards the message 416-2 at block 550, and the performance of the method 500 ends. That is, no event notification is generated after block 550. In other embodiments, the engine 216-2 can still send an event notification, and the event handler 108 downstream can be configured to detect that no change has occurred. In the event that the determination at block 545 were negative, the repository 128-F2S would be updated at block 555 not by overwriting the record relating to PNR-A, but by adding the correlation from the message 416-2 to any existing correlations in the record for PNR-A. Following such an addition, an event notification would be generated at block 535, as mentioned above.

A more complex example implementation of the methods 300 and 500 will now be discussed, in connection with FIGS. 6A-9B. Initially (i.e. before the performances of the method 500 discussed below), it is assumed that the repositories 120 and 128 are all empty. The example below involves three data objects, PNR-A, PNR-B and TKT-X, and also involves two versions of TKT-X. The expected final state of the repositories 128 is to reflect the following correlations: PNR-A1 is not correlated with any TKT objects; and PNR-B1 is correlated with TKT-X2 (and, by definition, TKT-X2 is correlated with PNR-B1).

Referring to FIG. 6A, four messages 600 containing raw data defining respective data objects are received at the storage nodes 116. In particular, a first message 600-1 defining a data object TKT-X1 is received at the storage engine 116-2. Second and third messages 600-2 and 600-3 are received at the storage node 116-1, defining data objects PNR-A1 and PNR-B1. A fourth message 600-4 is then received at the storage node 116-2, defining an updated version of the data object TKT-X, referred to as TKT-X2. Via respective performances of blocks 305, 310 and 315, the storage nodes 116 update the repositories 120 and generate update notifications. Update notifications 604-1, 604-2, 604-3 and 604-4 are illustrated in the storage nodes 116, but their transmission may be delayed for various reasons. The timing of transmission, as well as the order of transmission, may therefore vary. Of particular note, the repository 120-2 is updated to replace the data object TKT-X1 with TKT-X2 before any of the messages 604 are consumed (e.g. to be transmitted). In other words, the message 604-1, by the time of its transmission, will be outdated, as it relates to a version of TKT-X that no longer appears in the repository 120-2. Table 3 illustrates the content of the repositories 120 following the receipt of the messages 600 and generation (but not transmission) of the messages 604.

TABLE 3

| Repositories 120 | |
|---|---|
| Repository | Data Objects |
| 120-1 | PNR-A1; PNR-B1 |
| 120-2 | TKT-X2 |

As shown above, the repository 120-2 contains only the most recent version of the data object TKT-X.

Referring to FIG. 6B, transmission of the messages 604 begins. In the present example, the message 604-1 is the first message to be transmitted. Upon receipt of the message 604-1 at the correlator 212-2 (at block 320 of the method 300), the correlator 212-2 (at block 325 of the method 300) retrieves data from the repository 120-1, detects that the object TKT-X1 is correlated with the object PNR-A1, and generates two correlation messages at blocks 335 and 340: a full message 608-1 for transmission to the engine 216-2, and a partial message 608-2 for transmission to the engine 216-1. As with the previously discussed messages, however, the messages 608 are not immediately consumed/transmitted.

Turning to FIG. 7A, the message 604-3 is then delivered to the correlator 212-1. The correlator 212-1, based on data from the repository 120-2, detects that PNR-B1 is correlated with TKT-X2, and generates two correlation messages 608-3 and 608-4 (i.e. via blocks 335 and 340). The message 608-3 is a full message indicating the correlation in the direction as detected by the correlator 212-1, and the message 608-4 is a partial message indicating the correlation in the opposite direction as detected by the correlator 212-1. Following generation of the messages 608-3 and 608-4, the message 608-4 is delivered to the engine 216-2, while delivery of the message 608-3 is delayed.

At the engine 216-2, upon receipt of the message 608-4 (block 505), the determination at block 505 is negative, and the engine 216-2 proceeds via block 515 to block 540. The determination at block 540 is affirmative, and the determination at block 545 is negative (because the repository 128-S2F is empty). The repository 128-S2F is therefore updated to contain the correlation TKT-X2=>PNR-B1 (block 555), and an event is transmitted to the event handler (block 535) containing the same correlation.

Referring next to FIG. 7B, the message 604-2 is then delivered to the correlator 212-1. Via the performance of block 325, the correlator 212-1 consults the repository 120-2 and determines that PNR-A1 is not correlated with any e-tickets. The determination at block 330 is therefore negative, and block 335 is bypassed. Therefore, no partial message is generated, but a full message 608-5 is generated at the correlator 212-1, indicating an empty set of correlations for PNR-A1. In the present example, the message 608-5 is delivered immediately to the engine 216-1. The engine 216-1, via blocks 505, 510, 515, 517, 520, 525, 530 and 535, updates the repository 128-F2S with the correlation from the message 608-5.

Turning to FIG. 8A, the previously generated message 608-1 is then delivered to the engine 216-2 (block 505). The engine 216-2 makes a negative determination at block 510, and proceeds to block 517. At block 517, the determination is negative because the message 608-1 relates to an outdated version of the object TKT-X (i.e. TKT-X1, whereas the newer version TKT-X2 is already present). Therefore, the engine 216-2 proceeds to block 560 of the method 500, at which the message 608-1 is discarded (i.e. dropped). Then, at block 565, the engine 216-2 generates a removal command, also referred to as a removal message 612-1 for transmission to the engine 216-1. The removal message reflects the fact that, in tandem with the full message 608-1 that has been discovered to be outdated, a partial message 608-2 was also generated. The message 608-2 therefore also contains an outdated correlation, which will be transmitted to the engine 216-1. The removal message 612-1 then serves to reverse the outdated information conveyed by the partial message 608-2, in the event that the message 608-2 is accepted by the engine 216-1 (i.e. written to the repository 128-F2S).

Turning to FIG. 8B, the partial message 608-2 is delivered to the engine 216-1. The engine 216-1, via blocks 505, 510, 515, 540 (where the determination is affirmative, as the message 608-2 relates to the same version of PNR-A as the repository 128-F2S), 545, and 555, inserts the correlation PNR-A1=>TKT-X1 in the repository 128-F2S. As will be apparent to those skilled in the art, the correlation inserted in the repository 128-F2S in FIG. 8B is incorrect, as a result of the outdated nature of the message 608-2. The removal message 612-1 mentioned above serves to reverse the incorrect update shown in FIG. 8B. In the meantime, the engine 216-1 also sends an event notification to the event handler 108, indicating the correlation from PNRA-1 to TKT-X1.

Referring to FIG. 9A, the message 608-3 is next delivered to the engine 216-1. Via blocks 505, 510, 515, 517, 520, and 525, the engine 216-1 updates the repository 128-F2S to include both the previous correlation from PNR-A1 to TKT-X1 and a correlation from PNR-B1 to TKT-X2. An event is also sent, at block 535, to the event handler 108 indicating the correlation PNR-B1 to TKT-X2.

Turning to FIG. 9B, the removal message 612-1 is delivered to the engine 216-1. The determination at block 510 is affirmative, and the engine 216-1 therefore proceeds to block 570. At block 570, the engine 216-1 searches the repository 128-F2S for a correlation matching that defined in the removal message 612-1, and if the correlation is located, it is deleted. The repository 128-F2S is therefore updated as shown in FIG. 9B, to once again reflect the correct correlation from PNR-A1 (i.e. to no e-ticket objects).

The message 604-4 is then delivered to the correlator 212-2. Via another performance of blocks 320 to 340, the correlator 212-2 generates a partial message 608-6 and a full message 608-7. As will now be apparent, the messages 608-6 and 608-7 are both redundant with the contents of each of the repositories 128. Therefore, the engine 216-1 will make an affirmative determination at block 545 and discard the message 608-6. The engine 216-2, meanwhile, will make an affirmative determination at block 520, and discard the message 608-7. As noted earlier, the engine 216-2 may also generate an event notification with an identical correlation as a previously-sent correlation, and the event handler 108 may detect that no change has occurred.

Thus, the performance of the method 300 by the storage nodes 116 and the correlators 212 to maintain data objects and detect unidirectional components of bidirectional correlations, as well as the performance of the method 500 by the engines 216, enables the subsystem 124 to arrive at the correct set of correlations, even in the presence of various unpredictable delays in message delivery times that result in messages being generated and delivered out of order such that some messages contain information that is no longer accurate.

Other mechanisms are also contemplated for resolving conflicts between repository contents and incoming messages. For example, in other embodiments the outdated message 608-1 rather than being discarded, can be stored in the repository 128-S2F. That is, outdated full messages can be treated as partial messages and added to the repository 128 rather than discarded, such that the repository 128-S2F in FIG. 8A would contain a record for TX containing two correlations: TX2=>PB1; TX1=>PA1. In this implementation, receipt of the full message 608-7 (FIG. 9B) would result in the replacement of that record with the correct record shown in FIG. 9. In addition, the replacement would involve removal of the correlation TX1=>PA1. That removal, in turn, leads to an affirmative determination at block 530, and the generation of a removal message at block 565, similar to the message 612-1 (simply generated at a different time).

Those skilled in the art will appreciate that in some embodiments, the functionality of any of the applications 212 and 216 may be implemented using pre-programmed hardware or firmware elements (e.g., application specific integrated circuits (ASICs), electrically erasable programmable read-only memories (EEPROMs), etc.), or other related components.

The scope of the claims should not be limited by the embodiments set forth in the above examples, but should be given the broadest interpretation consistent with the description as a whole.

The invention claimed is:

1. A system comprising:
   (i) first-to-second correlation means configured to:
      determine correlations between first objects, as received via a first object feed, and second objects as stored at a second object storage; and
      generate first correlation messages indicative of the correlations for both a first-to-second object direction and a second-to-first object direction;
   (ii) second-to-first correlation means configured to:
      determine respective correlations between the second objects, as received via a second object feed, and the first objects as stored at a first object storage; and
      generate second correlation messages indicative of the respective correlations for both the second-to-first object direction and the first-to-second object direction;
   (iii) first-to-second correlation storage means configured to:
      receive the first correlation messages and the second correlation messages for the first-to-second object direction; and
      one or more of populate and update a first-to-second object correlation storage based on received correlation messages; and
   (iv) second-to-first correlation storage means configured to:
      receive the first correlation messages and the second correlation messages for the second-to-first object direction; and
      one or more of populate and update a second-to-first object correlation storage based on respective received correlation messages.

2. The system of claim 1, wherein the first-to-second storage means is further configured to, in response to storing an updated first-to-second object correlation at the first-to-second object correlation storage:
   transmit, to the second-to-first storage means, a command to remove an existing second-to-first object correlation at the second-to-first object correlation storage, the existing second-to-first object correlation corresponding to a first-to-second object correlation that is one or more of removed and updated by the updated first-to-second object correlation.

3. The system of claim 1, wherein the second-to-first storage means is further configured to, in response to storing an updated second-to-first object correlation at the second-to-first object correlation storage:
   transmit, to the first-to-second storage means, a command to remove an existing first-to-second object correlation at the first-to-second object correlation storage, the existing first-to-second object correlation corresponding to a second-to-first object correlation that is one or more of removed and updated by the updated second-to-first object correlation.

4. The system of claim 1, further comprising a first object feed means configured to:
   receive the first objects from the first object feed;
   store the first objects at the first object storage; and
   provide the first objects to the first-to-second correlation engine.

5. The system of claim 1, further comprising a second object feed means configured to:
   receive the second objects from the second object feed;
   store the second objects at the second object storage; and
   provide the second objects to the second-to-first correlation engine.

6. The system of claim 1, wherein the first-to-second storage means is further configured to one or more of populate and update the first-to-second object correlation storage based on the received correlation messages by one or more of:
   storing, at the first-to-second object correlation storage, a new first-to-second correlation indicated by the received correlation messages;
   adding, at the first-to-second object correlation storage, to an existing first-to-second correlation, an additional first-to-second correlation indicated by the received correlation messages; and
   replacing, at the first-to-second object correlation storage, the existing first-to-second correlation with an updated first-to-second correlation indicated by the received correlation messages.

7. The system of claim 1, wherein the second-to-first storage means is further configured to one or more of populate and update the second-to-first object correlation storage based on the respective received correlation messages by one or more of:
  storing, at the second-to-first object correlation storage, a new second-to-first correlation indicated by the respective received correlation messages;
  adding, at the second-to-first object correlation storage, to an existing second-to-first correlation, an additional second-to-first correlation indicated by the respective received correlation messages; and
  replacing, at the second-to-first object correlation storage, the existing second-to-first correlation with an updated second-to-first correlation indicated by the respective received correlation messages.

8. The system of claim 1, wherein the first objects and the second objects respectively comprise different ones of passenger name records, ticket data, schedule data, inventory data, customer management data, baggage and history data, crew data, flight management data, revenue accounting data, loyalty data, customer experience data, and customer relationship data.

9. The system of claim 1, wherein the first-to-second correlation storage means is further configured to: in response to populating or updating the first-to-second object correlation storage, transmit a first event notification to an event handler; and
  wherein the second-to-first correlation storage means is further configured to: in response to populating or updating the second-to-first object correlation storage, transmit a second event notification to the event handler.

10. A method comprising:
  at a first-to-second correlation means:
    determining correlations between first objects, as received via a first object feed, and second objects as stored at a second object storage; and
    generating first correlation messages indicative of the correlations for both a first-to-second object direction and a second-to-first object direction;
  at a second-to-first correlation means:
    determining respective correlations between the second objects, as received via a second object feed, and the first objects as stored at a first object storage; and
    generating second correlation messages indicative of the respective correlations for both the second-to-first object direction and the first-to-second object direction;
  at a first-to-second correlation storage means:
    receiving the first correlation messages and the second correlation messages for the first-to-second object direction; and
    one or more of populating and updating a first-to-second object correlation storage based on received correlation messages; and
  at a second-to-first correlation storage means:
    receiving the first correlation messages and the second correlation messages for the second-to-first object direction; and
    one or more of populating and updating a second-to-first object correlation storage based on respective received correlation messages.

11. The method of claim 10, further comprising, at the first-to-second storage means:
  in response to storing an updated first-to-second object correlation at the first-to-second object correlation storage, transmitting, to the second-to-first storage means, a command to remove an existing second-to-first object correlation at the second-to-first object correlation storage, the existing second-to-first object correlation corresponding to a first-to-second object correlation that is one or more of removed and updated by the updated first-to-second object correlation.

12. The method of claim 10, further comprising, at the second-to-first storage means:
  in response to storing an updated second-to-first object correlation at the second-to-first object correlation storage, transmitting, to the first-to-second storage means, a command to remove an existing first-to-second object correlation at the first-to-second object correlation storage, the existing first-to-second object correlation corresponding to a second-to-first object correlation that is one or more of removed and updated by the updated second-to-first object correlation.

13. The method of claim 10, further comprising, at a first object feed means:
  receiving the first objects from the first object feed;
  storing the first objects at the first object storage; and
  providing the first objects to the first-to-second correlation means.

14. The method of claim 10, further comprising, at a second object feed means:
  receiving the second objects from the second object feed;
  storing the second objects at the second object storage; and
  providing the second objects to the second-to-first correlation means.

15. The method of claim 10, further comprising, at the first-to-second storage means, populating or updating the first-to-second object correlation storage based on the received correlation messages by one or more of:
  storing, at the first-to-second object correlation storage, a new first-to-second correlation indicated by the received correlation messages;
  adding, at the first-to-second object correlation storage, to an existing first-to-second correlation, an additional first-to-second correlation indicated by the received correlation messages; and
  replacing, at the first-to-second object correlation storage, the existing first-to-second correlation with an updated first-to-second correlation indicated by the received correlation messages.

16. The method of claim 10, further comprising, at the second-to-first storage means, populating or updating the second-to-first object correlation storage based on the respective received correlation messages by one or more of:
  storing, at the second-to-first object correlation storage, a new second-to-first correlation indicated by the respective received correlation messages;
  adding, at the second-to-first object correlation storage, to an existing second-to-first correlation, an additional second-to-first correlation indicated by the respective received correlation messages; and
  replacing, at the second-to-first object correlation storage, the existing second-to-first correlation with an updated second-to-first correlation indicated by the respective received correlation messages.

17. The method of claim 10, wherein the first objects and the second objects respectively comprise different ones of passenger name records, ticket data, schedule data, inventory data, customer management data, baggage and history data, crew data, flight management data, revenue accounting data, loyalty data, customer experience data, and customer relationship data.

18. The method of claim 10, further comprising:
- at the first-to-second correlation storage means, in response to populating or updating the first-to-second object correlation storage, transmitting a first event notification to an event handler; and
- at the second-to-first correlation storage means, in response to populating or updating the second-to-first object correlation storage, transmitting a second event notification to the event handler.

\* \* \* \* \*